(12) United States Patent
Abe et al.

(10) Patent No.: US 9,171,535 B2
(45) Date of Patent: Oct. 27, 2015

(54) WATERPROOF SOUND-TRANSMITTING MEMBRANE AND ELECTRICAL PRODUCT

(75) Inventors: Yuichi Abe, Osaka (JP); Yuki Karube, Osaka (JP); Satoru Furuyama, Osaka (JP)

(73) Assignee: Nitto Denko Corporation, Osaka (JP)

(*) Notice: Subject to any disclaimer, the term of this patent is extended or adjusted under 35 U.S.C. 154(b) by 0 days.

(21) Appl. No.: 14/001,981

(22) PCT Filed: Dec. 15, 2011

(86) PCT No.: PCT/JP2011/007005
§ 371 (c)(1),
(2), (4) Date: Aug. 28, 2013

(87) PCT Pub. No.: WO2012/117476
PCT Pub. Date: Sep. 7, 2012

(65) Prior Publication Data
US 2013/0333978 A1    Dec. 19, 2013

(30) Foreign Application Priority Data

Mar. 3, 2011 (JP) .................. 2011-045838

(51) Int. Cl.
| | |
|---|---|
| G10K 11/00 | (2006.01) |
| H04R 1/08 | (2006.01) |
| B32B 27/00 | (2006.01) |
| H04M 1/18 | (2006.01) |

(52) U.S. Cl.
CPC ............. *G10K 11/002* (2013.01); *H04R 1/086* (2013.01); *B32B 27/00* (2013.01); *H04M 1/18* (2013.01); *H04R 2499/11* (2013.01)

(58) Field of Classification Search
CPC .. G10K 11/002; H04R 1/086; H04R 2499/11; B32B 27/00; H04M 1/18
USPC .................................. 181/286, 291, 293, 294
See application file for complete search history.

(56) References Cited

U.S. PATENT DOCUMENTS

| | | | |
|---|---|---|---|
| 4,968,464 | A | 11/1990 | Kojoh et al. |
| 5,286,279 | A | 2/1994 | Wu |

(Continued)

FOREIGN PATENT DOCUMENTS

| | | |
|---|---|---|
| EP | 2 219 387 | 8/2010 |
| JP | 57-160617 | 10/1982 |

(Continued)

OTHER PUBLICATIONS

Office Action issued in corresponding Japanese Application No. 2011-274086, Jun. 2, 2015, 9 pages—with an English translation.

*Primary Examiner* — Jeremy Luks
(74) *Attorney, Agent, or Firm* — Hamre, Schumann, Mueller & Larson, P.C.

(57) ABSTRACT

Provided is a waterproof sound-transmitting membrane 1 including: a solid resin film 2 having a plurality of through holes 21 formed therein; and a treatment layer 3 having water repellency and formed on at least one of two surfaces of the resin film 2 that are opposite to each other in the thickness direction. The treatment layer 3 has openings 31 at positions corresponding to the through holes 21. The air permeability of the waterproof sound-transmitting membrane 1 is 100 seconds/100 mL or less in terms of Gurley number.

8 Claims, 2 Drawing Sheets

(56) References Cited

U.S. PATENT DOCUMENTS

| | | | |
|---|---|---|---|
| 5,828,012 A * | 10/1998 | Repolle et al. | 181/175 |
| 6,512,834 B1 * | 1/2003 | Banter et al. | 381/386 |
| 6,932,187 B2 * | 8/2005 | Banter et al. | 181/149 |
| 2009/0268928 A1 * | 10/2009 | Ikeyama et al. | 381/150 |
| 2010/0206660 A1 * | 8/2010 | Horie et al. | 181/175 |
| 2011/0209265 A1 | 9/2011 | Komada et al. | |

FOREIGN PATENT DOCUMENTS

| | | | |
|---|---|---|---|
| JP | 60-038723 | * | 3/1985 |
| JP | 64-026655 | | 1/1989 |
| JP | 2003-503991 | | 1/2003 |
| JP | 2008-237949 | | 10/2008 |
| JP | 2010-070874 | | 4/2010 |
| WO | 01/03468 | | 1/2001 |

* cited by examiner

WATERPROOF SOUND-TRANSMITTING MEMBRANE AND ELECTRICAL PRODUCT

TECHNICAL FIELD

The present invention relates to a waterproof sound-transmitting membrane having waterproof properties and sound transmitting properties, and relates to an electrical product using the membrane.

BACKGROUND ART

Conventionally, in electrical products such as mobile phones, digital cameras, digital video cameras, and remote controllers, a housing containing an audio device such as a microphone and a speaker is provided with an opening for allowing transmission of sounds, and a waterproof sound-transmitting membrane is used to cover the opening. As an example of such a waterproof sound-transmitting membrane, Patent Literature 1 describes a porous membrane obtained by stretching a sheet made of polytetrafluoroethylene (PTFE).

CITATION LIST

Patent Literature

Patent Literature 1: JP 2003-503991 T

SUMMARY OF INVENTION

Technical Problem

Such a porous membrane obtained by stretching can easily be elongated, and therefore is irreversibly deformed when subjected to an external force. Accordingly, the porous membrane needs to be disposed at a position somewhat away from an audio device and a housing in order that contact of the porous membrane with the audio device or the housing is prevented even when the porous membrane is deformed.

In recent years, the size and thickness of electrical products have become increasingly smaller. From this standpoint, a waterproof sound-transmitting membrane that is less likely to be deformed is demanded.

In view of such circumstances, the present invention aims to provide a waterproof sound-transmitting membrane that is less likely to be deformed even when subjected to an external force, and provide an electrical product using the waterproof sound-transmitting membrane.

Solution to Problem

In order to solve the above problems, the present invention provides a waterproof sound-transmitting membrane including: a solid resin film having formed therein a plurality of through holes extending through the solid resin film in a thickness direction of the solid resin film; and a treatment layer having water repellency and formed on at least one of two surfaces of the resin film that are opposite to each other in the thickness direction. The treatment layer has openings at positions corresponding to the plurality of through holes. The waterproof sound-transmitting membrane has an air permeability of 100 seconds/100 mL or less in terms of Gurley number.

In addition, the present invention provides an electrical product including: a housing containing an audio device and provided with an opening for allowing transmission of sounds; and the above waterproof sound-transmitting membrane attached to the housing so as to cover the opening.

Advantageous Effects of Invention

With the above configuration, good waterproof properties can be ensured by the treatment layer, and good sound transmitting properties can also be ensured by an appropriate size of air paths formed by the through holes of the resin film and the openings of the treatment layer and extending through the waterproof sound-transmitting membrane. In addition, a resin film having been made porous by forming through holes cannot easily be elongated. Therefore, a waterproof sound-transmitting membrane that is less likely to be deformed even when subjected to an external force can be obtained.

DESCRIPTION OF EMBODIMENTS

Hereinafter, embodiments of the present invention will be described with reference to the accompanying drawings.

Figure 1:
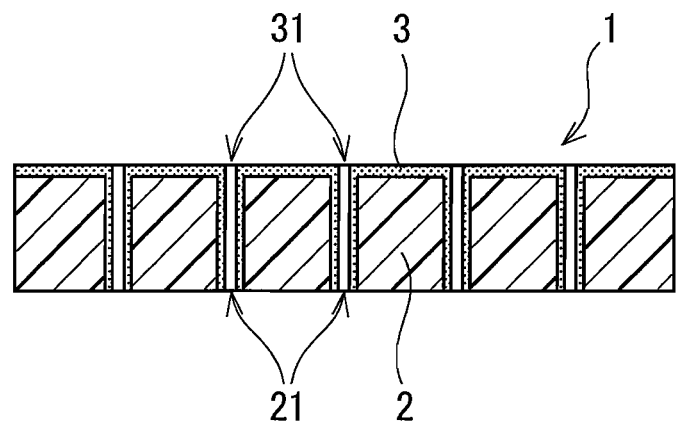
FIG. 1 is a schematic cross-sectional view of a waterproof sound-transmitting membrane according to an embodiment of the present invention.

A waterproof sound-transmitting membrane 1 according to an embodiment of the present invention is shown in FIG. 1. The waterproof sound-transmitting membrane 1 is attached to an electrical product including an internal audio device, and serves to protect the audio device from foreign matters such as water and dust. Specifically, the waterproof sound-transmitting membrane 1 is attached to a housing containing the audio device so as to cover an opening provided in the housing for the purpose of allowing transmission of sounds.

The waterproof sound-transmitting membrane 1 includes a solid resin film 2 and a treatment layer 3 formed on the resin film 2. Here, the term "solid" means that the inside of the film is filled with a resin.

A plurality of through holes 21 extending through the resin film 2 in the thickness direction are formed in the resin film 2. In other words, the through holes 21 are open at two surfaces of the resin film 2 that are opposite to each other in the thickness direction. Typically, the through holes 21 are straight holes having a constant cross-sectional shape and extending through the resin film 2 along a straight line. Such through holes can be formed, for example, by combination of ion beam irradiation and etching. By use of combination of ion beam irradiation and etching, through holes having uniform hole diameters and parallel axes can be formed in the resin film 2.

The cross-sectional shape of the through holes 21 is not particularly limited, and may be a circular shape or an indefinable shape. In addition, the axial directions of the through holes 21 need not coincide with a direction perpendicular to the two surfaces of the resin film 2 that are opposite to each other in the thickness direction, and may tilt relative to such a direction.

The through holes 21 have a hole diameter of 0.01 μm or more and 10 μm or less. The "hole diameter" means the diameter of a circle defined by regarding the cross-sectional shape of the through hole 21 as the circle. In other words, the "hole diameter" means the diameter of a circle having an area equal to the cross-sectional area of the through hole 21. The hole diameters of the through holes 21 need not be exactly the same among all the through holes 21, and it is sufficient that the values of the hole diameters be those which can be considered to be substantially the same among all the through holes 21 (e.g., the standard deviation is 10% or less of the average value). The hole diameters of the through holes 21 can be adjusted depending on the etching time or the concentration of an etching treatment liquid. Preferably, the through holes 21 have a hole diameter of 0.5 μm or more and 5 μm or less.

In addition, the through holes 21 are uniformly distributed so that the density of the through holes 21 preferably falls within a specified range included in a range from 10 holes/$mm^2$ to $1\times10^8$ holes/$mm^2$ over the entire surfaces of the resin film 2, and, for example, the maximum density is 1.5 times or less the minimum density. The density of the through holes 21 can be adjusted depending on the amount of ions applied at the time of ion beam irradiation. The density of the through holes 21 is preferably $1\times10^3$ holes/$mm^2$ to $1\times10^7$ holes/$mm^2$.

The porosity of the resin film 2 that can be determined by the proportion of the sum of the cross-sectional areas of all the through holes 21 to the area defined by the outline of the resin film 2, is preferably 50% or less, and more preferably 35% or less.

In addition, the thickness of the resin film 2 is not particularly limited. The ratio T/D of the thickness of the resin film 2 to the hole diameter, where D is the hole diameter and T is the thickness of the resin film, is preferably 1 or more and 10,000 or less, and more preferably 5 or more and 1,000 or less.

The resin film 2 preferably has a tensile strength of 60 MPa or more in two directions orthogonal to each other. Here, the "tensile strength" means a value resulting from converting, into a stress value, the tensile force at the moment when the resin film is broken by being pulled in one direction. When the tensile strength is less than 60 MPa, a large amount of deformation might be caused in the thickness direction by an external force. The tensile strength is more preferably 100 MPa or more, and even more preferably 150 MPa or more.

From the same standpoint, the elongation at break of the resin film 2 in two directions orthogonal to each other is preferably 300% or less. Here, the "elongation at break" means a value resulting from dividing, by the initial length of the resin film, the length of the resin film at the moment when the resin film is broken by being pulled in one direction. The elongation at break is more preferably 200% or less, and even more preferably 180% or less.

The material of which the resin film 2 is made is not particularly limited. It is preferable to use a material containing at least one of a hydrolyzable resin and an oxidatively-destructible resin. For example, the resin film 2 is made of at least one resin selected from polyethylene terephthalate (PET), polycarbonate (PC), polyimide (PI), polyethylene naphthalate (PEN), and polyvinylidene fluoride (PVdF).

For the aforementioned etching for forming the through holes 21, an etching treatment liquid is selected from an alkali solution and an oxidant according to the material of the resin film 2. Examples of solutions for hydrolyzing the resin include alkali solutions such as a potassium hydroxide solution and a sodium hydroxide solution. Examples of solutions for oxidatively destructing the resin include an aqueous solution of chlorous acid, an aqueous solution of hypochlorous acid, a hydrogen peroxide solution, and a potassium permanganate solution. For example, when the resin film 2 is formed of any of PET, PEN, and PC, a solution containing sodium hydroxide as a main component can be used as the etching treatment liquid, and when the resin film 2 is formed of PI, a solution containing sodium hypochlorite as a main component can be used as the etching treatment liquid.

Alternatively, a membrane filter sold by Oxyphen AG or Millipore Corporation can be used as the resin film 2 in which the through holes 21 are formed.

The resin film 2 need not consist of a single layer, and may consist of a plurality of layers.

In FIG. 1, the treatment layer 3 is formed on one of the two surfaces of the resin film 2 that are opposite to each other in the thickness direction. However, the treatment layer 3 may be formed on both of the two surfaces of the resin film 2. That is, it is sufficient that the treatment layer 3 be formed on at least one of the two surfaces of the resin film 2 that are opposite to each other in the thickness direction.

Specifically, the treatment layer 3 is formed in such a manner as to have openings 31 at positions corresponding to the through holes 21, and has water repellency. Preferably, the treatment layer 3 further has oil repellency. For example, such a treatment layer 3 can be formed as follows: a water-repellent agent or an oil-repellent agent having hydrophobicity is diluted with a diluting agent to prepare a treatment liquid; the treatment liquid is applied thinly onto the resin film 2; and the applied treatment liquid is dried. Examples of the water-repellent agent and the oil-repellent agent include perfluoroalkyl acrylate and perfluoroalkyl methacrylate. The thickness of the treatment layer 3 is preferably smaller than half of the hole diameter of the through holes 21.

When a treatment liquid is applied and dried on the resin film 2 in which the through holes 21 are formed as described above, the inner peripheral surfaces of the through holes 21 can also be coated with a second treatment layer continuous with the treatment layer 3. In this case, the sizes of the openings 31 of the treatment layer 3 are smaller than the sizes of the through holes 21 by the thickness of the second treatment layer.

Figure 2:
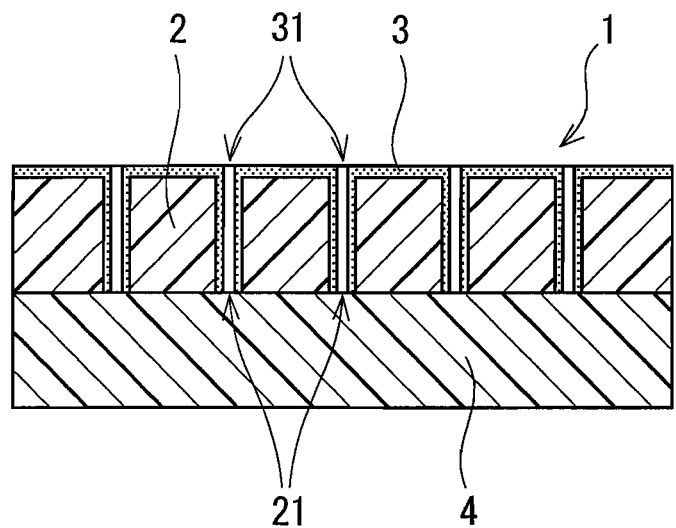
FIG. 2 is a schematic cross-sectional view of a waterproof sound-transmitting membrane according to another embodiment.

For example, as shown in FIG. 2, an air-permeable supporting member 4 may be laminated to the resin film 2. The air-permeable supporting member 4 may have the same shape as the resin film 2 as shown in FIG. 2, or may be formed in a ring shape along the edge portion of the resin film 2. In addition, the air-permeable supporting member 4 may be laminated to the surface of the resin film 2 on which the treatment layer 3 is not formed, or may be laminated to the surface of the resin film 2 on which the treatment layer 3 is formed, with the treatment layer 3 interposed therebetween. The air-permeable supporting member 4 preferably has better air permeability than the resin film 2. For example, a woven fabric, a nonwoven fabric, a net, a mesh, or the like, can be used as the air-permeable supporting member 4. In addition, examples of the material of the air-permeable supporting member 4 include polyester, polyethylene, and aramid resins. The resin film 2 and the air-permeable supporting member 4 are joined by a commonly-used method such as thermal welding and adhesion using an adhesive.

The waterproof sound-transmitting membrane 1 having the above configuration preferably has an air permeability of 100 seconds/100 ml or less in terms of Gurley number. Here, the Gurley number is a value obtained by performing measurement in accordance with Japanese Industrial Standards (JIS) P 8117. When the air permeability is more than 100 seconds/100 ml, the sound pressure loss caused by the waterproof sound-transmitting membrane is larger than 5 dB, and thus good sound transmitting properties cannot be obtained.

The air permeability of the waterproof sound-transmitting membrane 1 is more preferably 30 seconds/100 ml or less.

In addition, the water entry pressure (water pressure resistance) of the waterproof sound-transmitting membrane 1 measured in accordance with JIS L 1092-B (high-water pressure method) is preferably 10 kPa or more. The water entry pressure is more preferably 20 kPa or more.

Furthermore, the surface density of the waterproof sound-transmitting membrane 1 is preferably 1 g/m² to 50 g/m², and more preferably 5 g/m² to 40 g/m².

According to the waterproof sound-transmitting membrane 1 of the present embodiment, good waterproof properties can be ensured by the treatment layer 3, and good sound transmitting properties can also be ensured by an appropriate size of air paths formed by the through holes 21 of the resin film 2 and the openings 31 of the treatment layer 3 and extending through the waterproof sound-transmitting membrane 1. In addition, the resin film 2 which is made porous by forming the through holes 21 cannot easily be elongated. Therefore, the waterproof sound-transmitting membrane 1 that is less likely to be deformed even when subjected to an external force can be obtained.

EXAMPLES

Hereinafter, the present invention will be described in detail with reference to Examples. However, the present invention is not limited by these Examples to any extent.

First, methods for evaluating each of the waterproof sound-transmitting membranes fabricated will be described.

[Thickness]

The thickness of the waterproof sound-transmitting membrane was measured using a dial gauge.

[Average Pore Diameter]

The pore size distribution of the waterproof sound-transmitting membrane was measured using Perm Porometer manufactured by PMI, and the average pore diameter was calculated.

[Surface Density]

A piece having a diameter φ of 20 mm was stamped out of the waterproof sound-transmitting membrane with a punch, and then the mass of the piece stamped out of the waterproof sound-transmitting membrane was measured. The mass per 1 m² was calculated from the measured mass.

[Porosity]

The apparent density was obtained by multiplying the surface density by the thickness. The porosity of the waterproof sound-transmitting membrane was determined from the expression shown below, using the apparent density and the material density. The material density of PET was 1.4 g/cm³, and the material density of PTFE was 2.2 g/cm³.

$\{1-(apparent\ density/material\ density)\} \times 100$

[Air Permeability]

The Gurley number of the waterproof sound-transmitting membrane (the time required for 100 mL of air to pass through the waterproof sound-transmitting membrane under a predetermined applied pressure) was measured in accordance with JIS P 8117 (Gurley test method).

[Sound Pressure Loss]

Figure 3:
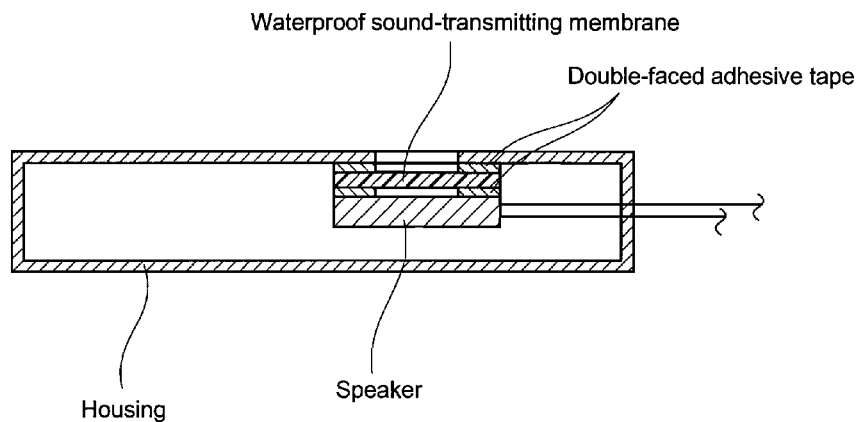
FIG. 3 is a diagram showing a method for measuring a sound pressure loss.

First, as shown in FIG. 3, an acrylic simulated housing having a length of 70 mm, a width of 50 mm, and a height of 15 mm was prepared, and an opening of φ 13 mm was formed in the simulated housing. Next, a piece of φ 16 mm was stamped out of the waterproof sound-transmitting membrane. Using a ring-shaped double-faced adhesive tape having an outer diameter of 16 mm and an inner diameter of 13 mm, the piece of the waterproof sound-transmitting membrane was attached to the inner surface of the simulated housing so as to cover the opening. Furthermore, a speaker (SCC-16A manufactured by STAR MICRONICS CO., LTD.) was attached to the back surface of the piece of the waterproof sound-transmitting membrane using the same double-faced adhesive tape.

Thereafter, a microphone (Type 2669 manufactured by B&K) connected to an acoustic evaluation apparatus (Multi-analyzer System 3560-B-030 manufactured by B&K) was placed 50 mm away from the speaker. A sound pressure was measured by the acoustic evaluation apparatus whose evaluation mode was set to SSR analysis (20 Hz to 20,000 Hz, sweep up). The difference between the measured sound pressure and a sound pressure obtained in the absence of the waterproof sound-transmitting membrane was calculated as a sound pressure loss. The smaller value of the sound pressure loss indicates that the original sound (the sound outputted from the speaker) was maintained better. When the sound pressure loss is 5 dB or less, the sound transmitting properties can be evaluated as good. Although the audible area varies from person to person, the audible area usually ranges from about 300 Hz to 4,000 Hz. In the present evaluation, the sound pressure at 1,000 Hz was used for evaluation.

[Pressure Test]

Figure 4A:
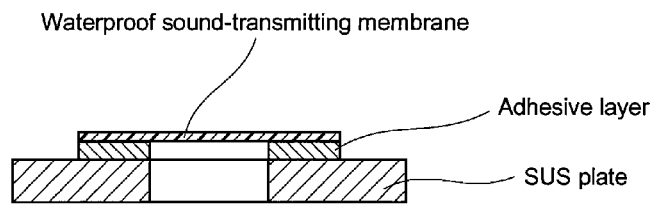
FIGS. 4A and 4B are diagrams for illustrating a pressure test.
Figure 4B:
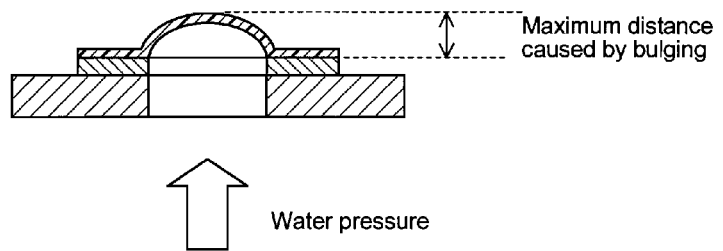

As shown in FIG. 4A, the waterproof sound-transmitting membrane was attached using an adhesive to a front surface of a SUS plate provided with a hole of φ 20 mm. Thereafter, as shown in FIG. 4B, the pressure test was performed by continuously applying a water pressure to the membrane from the back side of the SUS plate for 30 minutes. The pressure test was performed under the two different conditions: under the condition that the water pressure was set to 10 kPa corresponding to a water depth of 1 m; and under the condition that the water pressure was set to a double value, that is, 20 kPa. Thereafter, the maximum distance caused by bulging of the waterproof sound-transmitting membrane (the distance from the front surface of the SUS plate to the apex of the waterproof sound-transmitting membrane) was measured as the amount of deformation.

Example 1

A commercially-available product A (Oxydisk manufactured by Oxyphen AG), which is produced by forming through holes in a non-porous base sheet of PET by combination of ion beam irradiation and etching, was used as a resin film.

First, a treatment liquid was prepared by diluting an oil-repellent agent (X-70-029C manufactured by Shin-Etsu Chemical Co., Ltd.) with a diluting agent (FS thinner manufactured by Shin-Etsu Chemical Co., Ltd.) so that the concentration of the oil-repellent agent was 2.5% by weight. The resin film was fully immersed in the treatment liquid for about 3 seconds, then taken out from the treatment liquid, and left at ordinary temperature for about 1 hour for drying. A waterproof sound-transmitting membrane was thus obtained.

Example 2

A waterproof sound-transmitting membrane was obtained in the same manner as in Example 1, except that the resin film used was a commercially-available product B (Oxydisk manufactured by Oxyphen AG) produced by forming a plurality of through holes in a non-porous base sheet of PET by combination of ion beam irradiation and etching, the through holes being larger than those of the commercially-available product A.

Example 3

A waterproof sound-transmitting membrane was obtained in the same manner as in Example 1, except that the resin film used was a commercially-available product C (Oxydisk manufactured by Oxyphen AG) produced by forming a plurality of through holes in a non-porous base sheet of PET by combination of ion beam irradiation and etching, the through holes being larger than even those of the commercially-available product B.

Comparative Example 1

A waterproof sound-transmitting membrane was obtained in the same manner as in Example 1, except that a non-porous sheet of PET was used instead of the resin film.

Comparative Example 2

A waterproof sound-transmitting membrane was obtained in the same manner as in Example 1, except that a thin porous membrane obtained by stretching a sheet of PTFE was used instead of the resin film.

Comparative Example 3

A waterproof sound-transmitting membrane was obtained in the same manner as in Example 1, except that a thin porous membrane obtained by stretching a sheet of PTFE was used instead of the resin film.

Comparative Example 4

A waterproof sound-transmitting membrane was obtained in the same manner as in Example 1, except that the resin film used was a commercially-available product D (Oxydisk manufactured by Oxyphen AG) produced by forming a plurality of through holes in a non-porous base sheet of PET by combination of ion beam irradiation and etching, the through holes being distributed at a lower density than those of the commercially-available product A.

The results of the evaluations of the waterproof sound-transmitting membranes of Examples 1 to 3 and Comparative Examples 1 to 4 are shown in Table 1 and Table 2.

TABLE 1

|  | Thickness (μm) | Average pore diameter (μm) | Surface density (g/m²) | Porosity (%) |
|---|---|---|---|---|
| Example 1 | 26 | 0.4 | 31 | 15 |
| Example 2 | 25 | 0.8 | 26 | 27 |
| Example 3 | 25 | 1.0 | 26 | 27 |
| Comparative Example 1 | 27 | — | 38 | 0 |
| Comparative Example 2 | 10 | 0.2 | 4.2 | 81 |
| Comparative Example 3 | 60 | 0.4 | 30 | 77 |
| Comparative Example 4 | 26 | 0.1 | 32 | 3 |

TABLE 2

|  | Air permeability (sec/100 mL) | Sound pressure loss (dB) | Amount of deformation after pressure test (mm) | |
|---|---|---|---|---|
|  |  |  | At 10 kPa | At 20 kPa |
| Example 1 | 22.1 | 4.4 | 0.8 | 1.8 |
| Example 2 | 5.8 | 3.6 | 0.9 | 1.9 |
| Example 3 | 4.5 | 3.5 | 0.9 | 2.0 |
| Comparative Example 1 | — | 6.2 | 0.8 | 1.7 |
| Comparative Example 2 | 0.2 | 1.2 | 2.5 | 4.5 |
| Comparative Example 3 | 9.5 | 4.2 | 2.0 | 4.0 |
| Comparative Example 4 | 155 | 5.8 | 0.8 | 1.8 |

In Comparative Example 1 in which a non-porous sheet was used, the amount of deformation after pressure test was small. However, since there was not air permeability, the sound pressure loss was much larger than 5 dB, which means that the sound transmitting properties were poor. In Comparative Examples 2 and 3 in each of which a porous membrane obtained by stretching a sheet of PTFE was used, the amount of deformation after pressure test was large. In Comparative Example 4 in which a solid resin film having a plurality of through holes was used, the amount of deformation after pressure test was small. However, since the air permeability was more than 100 seconds/100 mL, the sound transmitting properties were poor.

By contrast, in Examples 1 to 3 in each of which a solid resin film having a plurality of through holes was used, not only was the amount of deformation after pressure test small, but also the sound transmitting properties were good since the air permeability was equal to or less than 100 seconds/100 mL.

The invention claimed is:

1. A waterproof sound-transmitting membrane comprising:
    a solid resin film having a plurality of through holes that are straight holes having a constant cross-sectional shape, the plurality of through holes extending through the solid resin film along a straight line in a thickness direction of the solid resin film, a density of the through holes being in a range from $1\times10^3$ holes/mm² to $1\times10^7$ holes/mm²; and
    a treatment layer having water repellency, the treatment layer being formed on at least one of two surfaces of the resin film that are opposite to each other in the thickness direction, the treatment layer having openings at positions corresponding to the plurality of through holes, wherein
    the waterproof sound-transmitting membrane has an air permeability of 100 seconds/100 mL or less in terms of Gurley number.

2. The waterproof sound-transmitting membrane according to claim 1, wherein the waterproof sound-transmitting membrane has a water entry pressure of 10 kPa or more when the water entry pressure is measured in accordance with a high water pressure method defined in JIS L 1092-B.

3. The waterproof sound-transmitting membrane according to claim 1, wherein the treatment layer further has oil repellency.

4. The waterproof sound-transmitting membrane according to claim 1, wherein the resin film is made of at least one of a hydrolyzable resin and an oxidatively-destructible resin.

5. The waterproof sound-transmitting membrane according to claim 4, wherein the resin film is made of at least one selected from polyethylene terephthalate, polycarbonate, polyimide, polyethylene naphthalate, and polyvinylidene fluoride.

6. The waterproof sound-transmitting membrane according to claim 1, further comprising an air-permeable supporting member laminated on the resin film.

7. An electrical product comprising:
a housing containing an audio device and provided with an opening for allowing transmission of sounds; and
the waterproof sound-transmitting membrane according to claim 1 attached to the housing so as to cover the opening.

8. The waterproof sound-transmitting membrane according to claim 1, wherein a porosity of the solid resin film is 35% or less, where the porosity is a proportion of the sum of cross-sectional areas of the through holes to an area defined by an outline of the solid resin film.

\* \* \* \* \*